United States Patent [19]
Myers

[11] 3,840,718
[45] Oct. 8, 1974

[54] DRUM GROOVING APPARATUS AND METHOD

[75] Inventor: Robert D. Myers, West Allis, Wis.

[73] Assignee: Harnischeger Corporation, W. Milwaukee, Wis.

[22] Filed: Aug. 6, 1973

[21] Appl. No.: 386,152

[52] U.S. Cl................ 219/68, 148/9.5, 219/69 R, 219/124, 219/159
[51] Int. Cl............................................ B23k 9/00
[58] Field of Search...... 148/9.5, 9 R; 219/68, 69 R, 219/70, 124, 125 R, 125 PL, 159, 69 P

[56] References Cited
UNITED STATES PATENTS

| | | | |
|---|---|---|---|
| 2,125,178 | 7/1938 | Ullmer | 148/9.5 |
| 2,289,786 | 7/1942 | Jones | 148/9.5 |
| 2,873,224 | 2/1959 | Thompson et al. | 148/9.5 |
| 2,989,617 | 6/1961 | Stepath | 219/124 X |
| 3,210,514 | 10/1965 | Stepath | 219/70 |
| 3,333,081 | 7/1967 | Inoue | 219/69 P |
| 3,392,255 | 7/1968 | Rye et al. | 219/68 |
| 3,474,013 | 10/1969 | Inoue | 219/68 X |
| 3,743,259 | 7/1973 | Hennelly | 148/9 R X |

*Primary Examiner*—E. A. Goldberg
*Assistant Examiner*—N. D. Herkamp
*Attorney, Agent, or Firm*—James E. Nilles

[57] ABSTRACT

A grooved hoist drum is formed from a steel pipe mounted in a turning lathe. A carbon torch unit is mounted on the lathe carriage with the carbon electrode aligned with the periphery of the drum generally at the horizontal plane through the drum axis. An air jet is projected to the top of the arc to remove the molten metal. An electrode feed control is also mounted on the carriage and actuates the carbon electrode to maintain a constant arc voltage. A separate power supply and an air supply is connected to the torch unit, with the power return made directly to the chuck shaft, to strike the arc and establish the removing air jet. The simultaneous rotation of the drum and the traversing of the carriage produces a grooved drum with the groove surface in a hardened finished state.

17 Claims, 7 Drawing Figures

FIG. 2

| DRUM GROOVE SET UP CARD | |
|---|---|
| DEPTH – A | 7/32 |
| WIDTH – B | 1/2 |
| PITCH – C | 9/16 |
| DRUM DIA. | 12 1/2 |
| AMPS | 500 |
| VOLTS | 38 |
| R.P.M. | 7.5 ON DIAL |
| CARBON | 3/8 |
| TEETH | 45 |
| TEETH | 40 |

DRUM GROOVING APPARATUS AND METHOD

BACKGROUND OF THE INVENTION

This invention relates to a drum grooving apparatus and method for forming of a continuous helical groove in an outer peripheral surface of a drum and particularly such a drum for coiling and uncoiling of a hoist rope or the like.

Hoist apparatus generally employs a hoist drum upon which a hoist rope is wound and unwound for raising and lowering of loads. The hoist drum is conventionally formed of a cast member with a continuous helical groove for the wire hoist rope. The groove has a generally cupshaped cross section with a circular base and outwardly tapered side walls, with a relatively flat edge between the adjacent grooves to support the rope convolutions. The cast drum normally requires some machining of the grooves to provide relatively smooth surface.

Alternatively, machined drums have been employed wherein the drum periphery is appropriately cut with suitable metal cutting tools. Machine drums are significantly more expensive than cast drums and are generally only employed when production scheduling or the like interferes with the normal processing of cast drums.

There is therefore a very significant need for a rapid and relatively inexpensive production method of forming a helically grooved drum for hoist systems and the like and with drums which will maintain the expected or required useful life in actual operation.

SUMMARY OF THE INVENTION

The present invention is particularly directed to an arc cutting apparatus and method for forming of a grooved drum in a rapid and relatively inexpensive manner. Generally, in accordance with the present invention a conventional steel drum is rotatably mounted in a suitable turning mechanism or apparatus, such as a lathe device. An arc cutting torch is mounted adjacent the periphery of the drum upon a carriage means and an arc is struck between the periphery of the drum and a torch electrode. The rotation of the drum and moving of the carriage means causes the trasversing of the drum periphery. The arc melts the metal which is removed preferably by gravity and a fluid jet to directly generate a properly finished groove having a cylindrical base, and for grooves approaching the size of the rope, outwardly projecting side walls to define the required cross section. The arc cutting of the groove with the inherent rapid quench also results in a hardened wear surface in the groove, thus providing an improved drum characteristic.

In accordance with a particular novel feature and construction of the present invention, the drum is mounted within a lathe type rotating support with a horizontal axis of rotation. The lathe is provided with a motor-gear reducer drive having suitable change gears to permit varying of the drum and carriage speed and direction and thereby the pitch of the helically formed groove. A carbon arc electrode assembly or unit is mounted on the lathe carriage along with a suitable automatic carbon positioning or locating drive control having an arc voltage sensing means with one lead connected to the drum through the head stock of the lathe. An air jet system is incorporated into the electrode assembly for directing of an air jet over the top of the electrode and on to the work to continuously assist in the removal of the molten metal generated by the carbon arc. The assembly includes means for adjusting the linear and angular orientation of the carbon electrode and associated air jet with respect to the drum periphery to locate the arc just below the horizontal plane through the drum axis. A separate variable voltage supply is coupled to the electrode through the carriage mounted control and to the drum through the head chuck shaft of the lathe. The removed metal is directed downwardly into a receiver, which is provided with a water spray means. The water cools the removed metal to minimize build up in the walls of the receiver as well as eliminating dirt, dust and the like.

The drum itself is a steel (mild, medium, high carbon or alloy) drum having a cover or surface coating of paint or similar material like that conventionally employed to prevent rusting of the drum during storage and processing. The painted surface functions as an anti-slag and spatter proof protection during the formation of the groove and contributes to formation of the highly finished groove which can be directly employed without the necessity of final machining.

The apparatus of this invention can employ a carbon arc source similar to that widely employed in the preparation of steel plate members for welding wherein the abutting edges of flat and round plates which are to be welded together are normally bevelled and back gouged prior to the actual arc welding to define a deep U-shaped groove within which weld metal is deposited by a consummable metal arc process. In that application, the electrode is located at approximately 45° to 50° to the work such that significant penetration results with the formation of a relatively deep U-shaped groove. In the present invention, the carbon electrode is oriented more or less tangentially with respect to the work to define a finished groove having a smooth cylindrical base, and where required outwardly shaped side walls for receiving of the wire rope. The width of the groove will be essentially controlled by the diameter of the electrode while the depth is controlled by the interrelationship between the rotational speed of the drum and the current setting for the arc.

The present invention permits the direct finished grooving of hoist drums and the like with the adjustable speed and electrode size permitting varying of the pitch and size of the groove. The grooved drum can be employed without any further significant finishing and provides an improved wear surface, as a result of the hardening of the surface by the heat of the arc and subsequent rapid quenching inherent in the process. Further, the system is particularly adapted to automatic formation of the groove with a minimum of operator skill requirements. Thus, the machine setting for any given grooved drum can be readily tabulated on an instruction card with the operator required merely to set the welding power controls and the speed controls in accordance with the specification to automatically adjust the machine for the required or desired result.

The present invention thus provides a relatively simple, reliable, and inexpensive apparatus and method for producing an improved hoist drum and the like, having a continuous helical groove formed in the outer peripheral surface.

These and other objects and advantages will appear hereinafter as this disclosure progresses, reference being had to the accompanying drawings.

DESCRIPTION OF A PREFERRED EMBODIMENT

Figure 1:
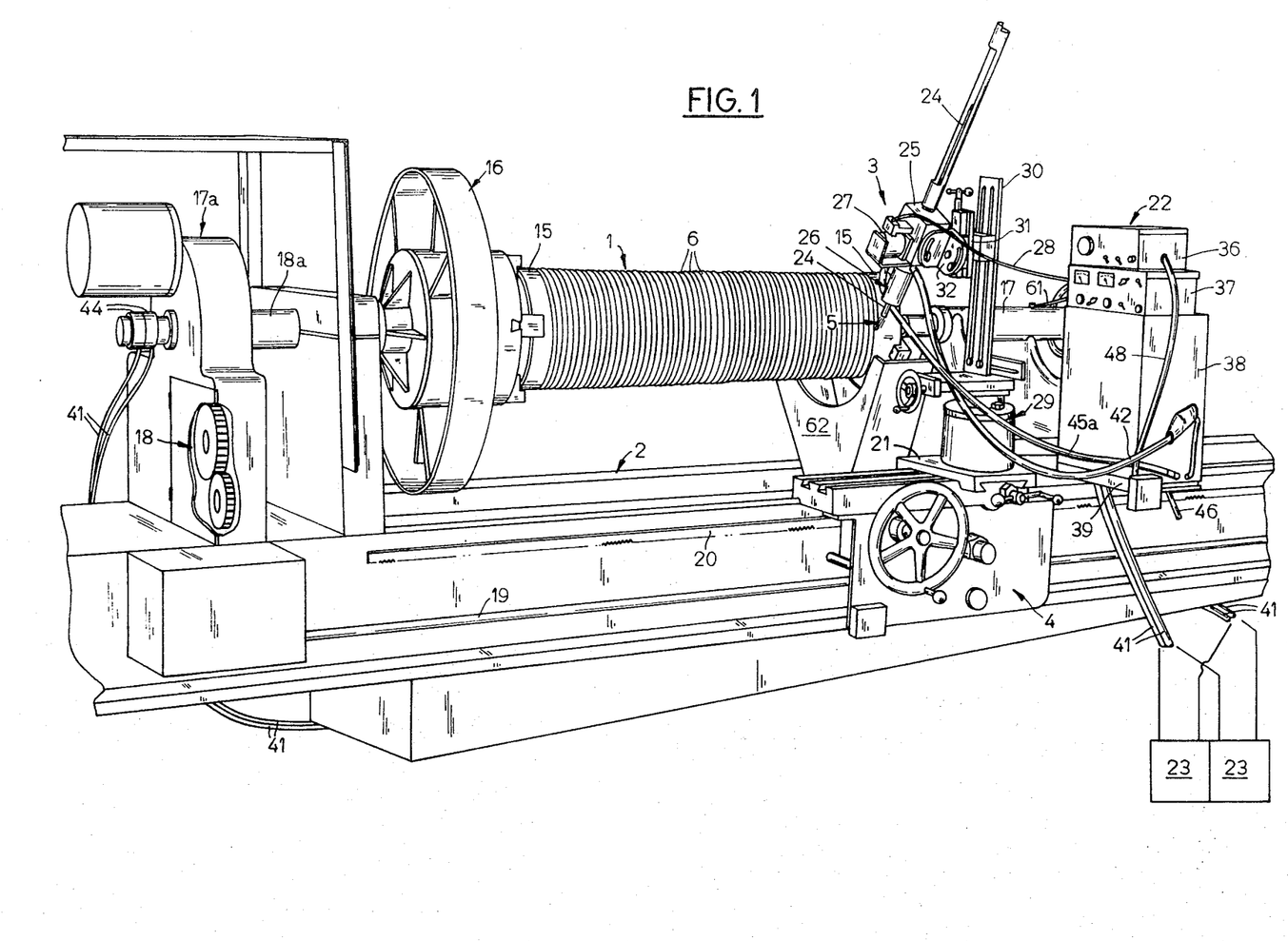
FIG. 1 is a pictorial view of an apparatus constructed in accordance with the present invention with forming of a groove hoist drum.

Referring to the drawings and particularly FIG. 1, a hoist drum 1 is shown mounted in a turning lathe 2 for rotation of the drum at a predetermined constant speed. A carbon electrode torch unit 3 is mounted on the lathe carriage unit 4. The torch unit moves longitudinally of the drum with an arc 5 struck to the drum 1 to selectively remove metal from the drum periphery and directly form a finished helical rope groove 6 on the periphery of the drum.

Figure 2:
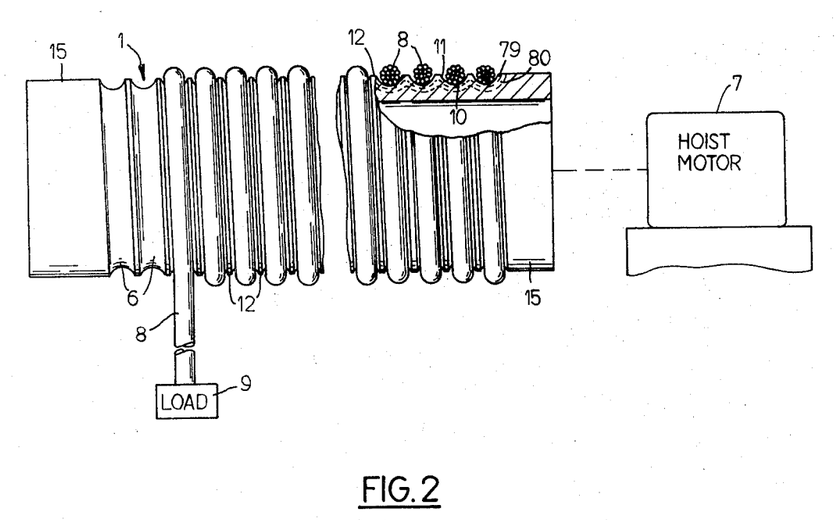
FIG. 2 is an enlarged fragmentary view of a hoist drum apparatus constructed in accordance with the apparatus of the present invention.

As more clearly shown in FIG. 2, the drum 1 forms a part of a hoist mechanism and is coupled to a hoist motor 7 which in turn forms a part of a crane or other similar hoisting device. A hoist rope 8 is wound in the groove for selective winding on and from the drum 1 with the free end of the rope provided with a suitable load carrier 9. Rope 8 is a conventional wire rope widely employed with grooved drums as a part of the hoist apparatus. The grooves 6 are particularly formed with a basic cylindrical cross section slightly larger than the diameter of the rope to define a cylindrical base portion 10 generally conforming to the curvature of the engaged periphery of the rope 8 and slightly outwardly flaring side walls 11 in spaced relation to the periphery of the rope. The pitch of the helical groove is selected to slightly space adjacent turns or convolutions of the rope 8 with the grooves separated or spaced by slightly flat peripheral surfaces 12. In the illustrated embodiment of the invention, the grooves are illustrated with a depth slightly less than one-half of the diameter of the wire rope 8. In accordance with conventional practice, the depth may also essentially correspond to the depth of the wire rope. Such grooves are similar to those illustrated except that the depth of the groove is increased with the sidewall extending outwardly generally as relatively linear extensions of the illustrated grooves, with an angle of approximately 15°. Thus, they maintain the cylinder base portion generally conforming to the diameter or configuration of the rope and then flare outwardly as illustrated with the upper half extending as generally planar extensions. Either type of groove can be formed with the present invention.

Figures 3, 4, 5:
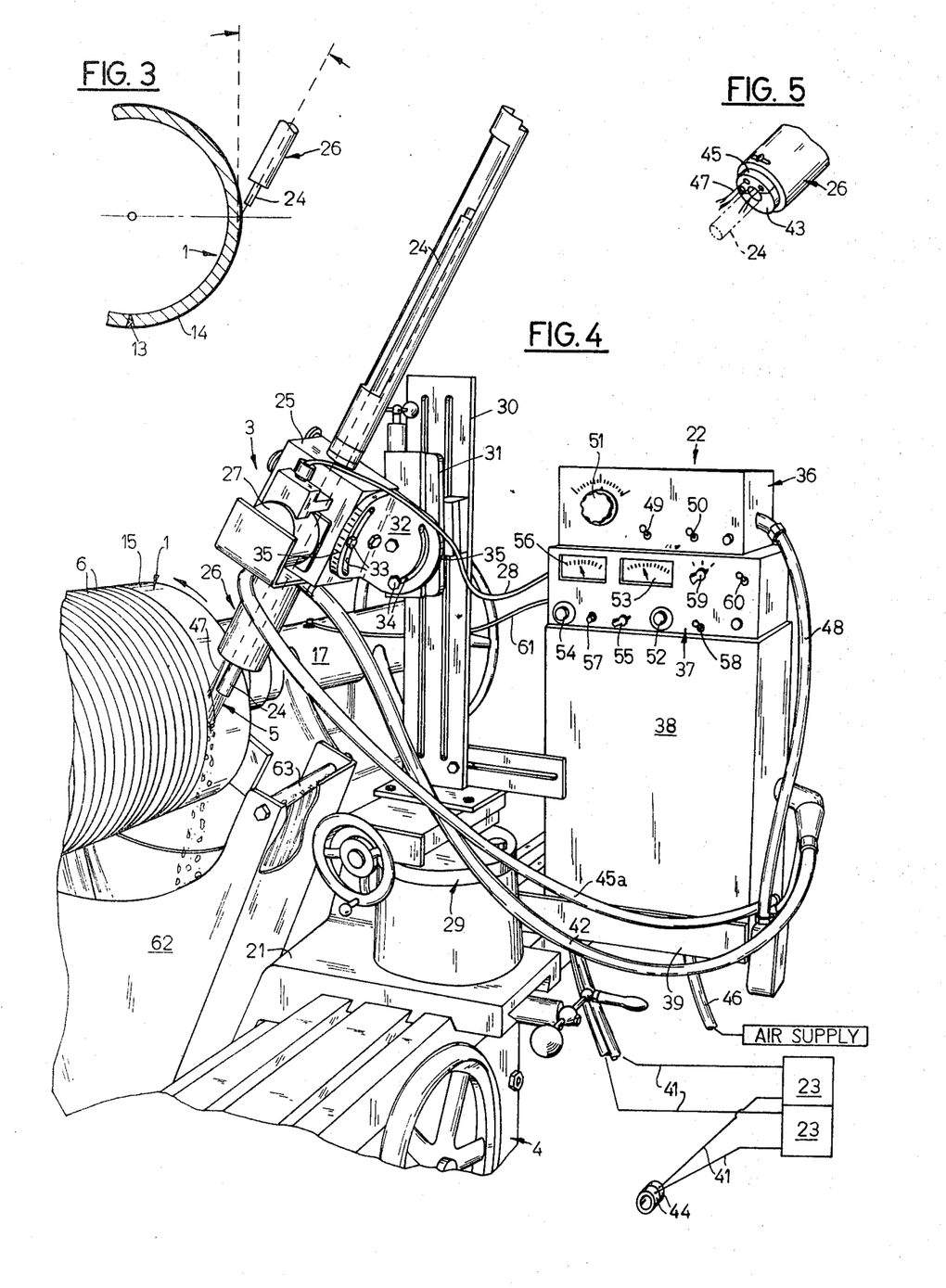
FIG. 3 is an enlarged, fragmentary view of the drum before processing with the cutting torch diagrammatically illustrated in relationship to the drum periphery.
FIG. 4 is a fragmentary, enlarged view of a portion of FIG. 1 more clearly illustrating the electrode mounting fixture and control mounted as a part of the turning apparatus shown in FIG. 1.
FIG. 5 is a separate fragmentary view of the electrode contact block assembly showing the specially formed adjusting slot which permits rotation materially affecting the discharge of molten metal and slag.

As shown in FIG. 3, the drum 1 is a cylindrical member which may be formed of a conventional welded mild, medium or high carbon or alloy steel and in particular, from a plate-like member rolled into a cylindrical member with a longitudinal weld 13 or may be fabricated from appropriate sized pipe or seamless tubing.

The surface of the pipe is conventionally painted with a protective black lead paint 14 or the like after formation of the pipe to prevent rusting of the pipe surface and the like during subsequent handling.

In accordance with the present invention, the pipe drum is mounted in the lathe structure or unit 2 with the opposite ends which are not grooved as at 15 appropriately secured within a conventional head stock and chuck 16 and tail stock 17 of the lathe unit 2. The head chuck positively grasps the free pipe end 15 and is driven from a suitable electric motor or the like to rotate the drum 1 at a predetermined constant speed. In accordance with the present invention, the lathe structure is provided with a special motor gear reducer assembly 17a including rapid change gears 18 coupled to the chuck shaft 18a to permit a groove pitch in relation to drum rotation. The depth of the groove 6 is controlled not only by the intensity of the arc path, but by the relative speed of the drum 5. The exposed change gears 18 provide a very convenient and rapid means permitting the operator to conveniently change the speed of the drum rotation as well as the carriage traverse in accordance with a predetermined design and selection.

The lathe unit, in accordance with conventional construction, includes a lead screw 19 or the like driven from the gear unit 18 of the drum drive through a conventional drive to move the carriage assembly 4 longitudinally of the lathe on the conventional supporting lathe bed 20. The carriage assembly 4 includes a cross slide 21 movable laterally of the bed and thus toward and away from the drum structure. The carbon arc torch unit or assembly 3 is mounted on the slide 21 with suitable adjustment means to permit accurate placement of the assembly with respect to the drum and particularly the periphery thereof, to permit accurate striking of the arc 5. The torch assembly 3 is selectively controlled from a control assembly 22 also mounted on the carriage assembly 4 for controlling the connection of a separate power supply 23 to the assembly 3 and the formation of the arc 5 by controlled feeding of an electrode 24.

The power supply 23 is a suitable variable voltage, dc power supply having a sufficient current capacity to operate the carbon arc torch assembly 3. In actual practice, applicant has found that a pair of commercial dc power welding supply each having an output rating of 650 amperes were advantageously provided and connected in parallel to produce the required voltage and current for the various sized electrodes required for the drum grooving process over a wide range of different sized drums and on a 100 percent duty cycle basis. The power source is preferably of a drooping voltage curve or characteristic and is connected into the circuit with reverse polarity. As such power supplies are readily available and well known in the art of arc welding, no further description thereof is given.

The illustrated torch assembly 3 is similar to that presently employed in the preparation of plate edges for consummable metal electrode arc welding and the like. Thus, the assembly 3 includes a carbon electrode 24 which may be one or more individual electrode elements interconnected to form an elongated carbon electrode which extends through the assembly 3 and particularly through a support and drive housing unit 25. A tubular contact block unit 26 is secured to the bottom side of the housing 25 with the electrode passing therethrough to provide power to the electrode 24 immediately adjacent to the arc end. The carbon electrode 24 is consumed during the arcing process and a feed motor 27 is mounted to the housing 25 and coupled by a conventional friction drive or the like to positively propel the carbon electrode 24 toward the drum in a controlled manner to compensate for the consumption of the electrode. The motor power line 28 is connected to power by control unit 37 to adjust the electrode spacing from drum 1 with a very accurate control of the arc energy to maintain accurate metal removal. The upper side of the housing 25 is provided with a tubular protective member which projects upwardly to maintain the upper end of the electrode 24 which of course is also at the welding potential in a protective enclosure.

The torch assembly as previously noted is mounted on the cross slide 21 and as illustrated most clearly in FIG. 4, the support includes a cylindrical type support assembly 29 having a further longitudinal adjustment slide structure for longitudinal placement of the electrode 24 relative to the driven carriage assembly 4. An upstanding support plate 30 is secured to the unit 29 and includes a vertically adjustable slide 31 mounted thereon. A generally L-shaped mounting plate or bracket 32 is interconnected between the housing 25 and the slide 31 to mount the housing to the carriage assembly. The L-shaped bracket 32 includes a central pivot attachment to each of the housing 25 and the slide 31 to further permit angular orienting of the torch assembly 3. Thus, the attachment of the bracket 32 to the housing 25 includes a slot and bolt adjustment connection 33 which permits rotation of the housing 25 on the bracket 32 and locking in selected positioning for angular orientation of the electrode 24 with respect to the drum. Generally, the electrode is located essentially on a diametrical plane through the drum to locate the arc 5 on the horizontal plane through the drum axis. In addition, the attachment of the bracket 32 to the slide 31 includes a similar bolt and slot connection 34 to permit angular orienting of the bracket 32 and therefore the housing 25 about an axis generally parallel and in spaced relation to the drum 1. This permits adjustment of the angle of the electrode 24 as by indicating indicia 35 and therefore the projection of the arc 5 with respect to the periphery of the drum 1. The formation of the groove 6 and particularly the accurate formation of an arcuate base portion 10 is selectively controlled by the angular orientation of the electrode 24 with respect to the drum 1. Generally, applicant has found that the electrode should be mounted, as diagrammatically illustrated in FIG. 3.

Thus, the electrode 24 is generally located to strike the arc 5 on the periphery of the drum lying just beneath a horizontal plane through the drum axis. Further, the electrode is angularly orientated in a plane through the drum which is normal to the axis and is located in such a plane with a relatively small angle between the electrode and the vertical plane to the periphery of the arc position. This is somewhat in contrast to the more conventional application of preparation of grooves for arc welding and the like where a relatively deeper angle is maintained. Thus, conventionally the electrode is set into the work member at approximately 45°.

Applicant has found that an angle of approximately 30° provides a highly satisfactory groove with a highly cylindrical base portion conforming to the curvature of the wire rope 8. The width of the groove and consequently, the radius of the base is controlled by selection of the diameter of the electrode. Generally, the width of the groove will be slightly greater than the diameter of the carbon electrode whereas the depth of the groove is primarily controlled by the proper selection of the drum rotational speed and the intensity of the arc which of course is controlled by the setting of the arc power.

As previously noted, the arc is driven by a variable voltage supply 23 with the amperage accurately controlled by the control assembly 22 to maintain the desired metal removing characteristic.

Generally, the control assembly 22 mounted on the carriage includes a variable speed rotation control 36, a voltage sensing control unit 37 and a basic welding current control assembly 38 mounted in stacked relation on a suitable support 39 carried by the carriage assembly 4. Thus, the power supply 23 for establishing and maintaining of arc 5 includes a plurality of connecting power cables 41 from the welding supply 23, with one side of the supplies connected to the control unit 38 and selectively connected to a single power cable 42 connected to a U-shaped copper contact 43 within the bottom side of unit 26. The electrode 24 may be urged into firm sliding engagement with the contact 43 by a suitable spring member, not shown, to maintain firm current transfer to the carbon electrode. The return path is from the drum 1 and particularly through the head stock and chuck shaft 18a of the lathe 2 to the ground return cables 41 of the power cables 41. The ground return cables 41 are directly connected to the check shaft 18a by suitable sliding connectors 44 to minimize the contact connections.

In practice, each of the welding supplies 23 is separately connected to the control unit 37 by a pair of cables 41 and to the shaft 18a by a pair of cables 41 to carry the large currents particularly required to large grooves.

To properly remove the molten metal formed by the arc, a fluid stream or jet, preferably air, is projected from the upper side of the contact unit 26 downwardly along the electrode 24 and onto the upper surface of the arc thereby tending to positively propel the molten metal from the surface of the pipe 1 downwardly. Thus, the air flow assists the natural gravity discharge of the molten metal, spatter and slag. The unit 26 includes an upper semicircular block 45 mating with the contact block 43. Block 45 has a plurality of axial air passageways connected to an input air line 45a from the control unit 38. A suitable solenoid valve or the like may be selectively actuated with the turn-on of the power to complete the connection of the air line 45a to a source line 46 just prior to the creation of arc 5 to maintain the material removing air column during the welding process. The source line 46 may be connected to any suitable air source such as conventionally available in a manufacturing plant for manufacturing hoist devices. Alternatively of course, a special air source can be supplied. Generally, for adequate or optimum results, the air supply should be capable of delivering 50 cubic feet per minute at 80 to 100 pounds per square inch at the control unit. Blocks 43 and 45 are rotatable in unit 26 which enhances the discharge of molten metal and slag. In the illustrated embodiment of the invention, the air is discharged to the assembly by a plurality of three axial passageways circumferentially formed or spaced within the upper half of the tubular contact unit 26. The semi-circular air column 47 introduced to the top side of the arc to continuously engage the drum 1 immediately above the arc 5 and to then force the molten material downwardly from the periphery of the drum.

Further, as previously noted, the surface of the drum is preferably provided with the protective leaded paint cover 14 which further contributes to the anti-spatter and slag sticking characteristic to maintain a highly finished groove 6 in drum 1.

The arc 5 is accurately controlled, as previously noted, by feeding of the electrode 24 towards the work in accordance with the consumption and further, as in an adjustable variable rate to maintain the desired arc cutting characteristic. Thus, the basic input unit 36 includes a main power connection having its input power connected from an input lead and power box 48. The main control unit includes a main on-off advance control switch 49 as well as an air purge control switch 50 for initially purging of the air system. In addition, the control 36 includes a variable wire feed control 51 which is adapted to vary the power supply to the motor 27 to adjust the speed thereof as more fully developed hereinafter.

The actual electrode feed rate is modulated to maintain the desired arcing characteristic by the sensing unit 37 which couples the control unit 36 through the basic control assembly 38 to the motor 27. Thus, the control 37 includes a voltage control 52 which is adjusted to pre-select a desired arc voltage which may be exhibited on a visual display voltage meter 53. A sensitivity control 54 is interconnected in the control circuit to control the response of the sensing control to variations in arc voltage. An amperage control 55 may be interconnected with the voltage control to periodically vary the actual amperage level. The arc amperage is displayed on a suitable amp meter 56.

A push button 57 is provided to momentarily stop the modulation of the control and to increase the amperage and thus the cutting characteristic of the arc 5 in accordance with the setting of control 55. For example, if the drum 1 is formed of a welded pipe with a weld 13 such as shown in FIG. 3, it may be necessary to momentarily prevent the modulation of the arc as the arc moves through the weld portion 13 to maintain the desired grooving characteristic. In addition, the sensing controls will include the conventional forward and reverse switch for reversing of the electrode drive, an automatic and manual setting control switch 59 to permit the automatic control of or a manual feed of the electrode where desired. In addition, a main on-off power air switch 60 and an associated ready lamp may be provided in accordance with conventional practice.

The unit 38 more particularly as hereinafter described, compares the preset voltage and amperage settings with the actual arc voltage by comparing the voltage on the electrode 24 and a ground return sensing line, shown as a sensing line 61, to modulate the power supplied to the electrode 24. The sensing return line 61 is connected to the control unit 37 at one end and to the tail stock 17 at the opposite end.

In operation, the arc melts the metal of the drum 1 with the molten metal defining the groove 6 as shown in FIGS. 3 and 4. The molten metal drops from the drum 1 and is further positively forced therefrom by the air jet which moves downwardly over the upper surface of the electrode to the top of the arc and positively propels the molten metal downwardly. In accordance with the illustrated embodiment of the invention, a molten metal receiver 62 is secured to the carriage assembly and particularly to the slide 21 to move with the torch assembly 3 and particularly beneath electrode 24. The receiver 62 is furthermore provided with opposite spraying nozzles 63 establishing a relatively continuous cooling liquid flow across the entrance side of the receiver 62. Thus as the molten material drops into the receiver 62, it is rapidly cooled to prevent sticking, such that it does not tend to stick and build up on the walls of the receiver. The water spray will also tend to minimize the creation of dust and dirt within the surrounding atmosphere. The water nozzles 63 may, of course, be connected to any suitable cooling water source or the like, such as a hose, to permit traversing of the drum 1.

Figure 6:
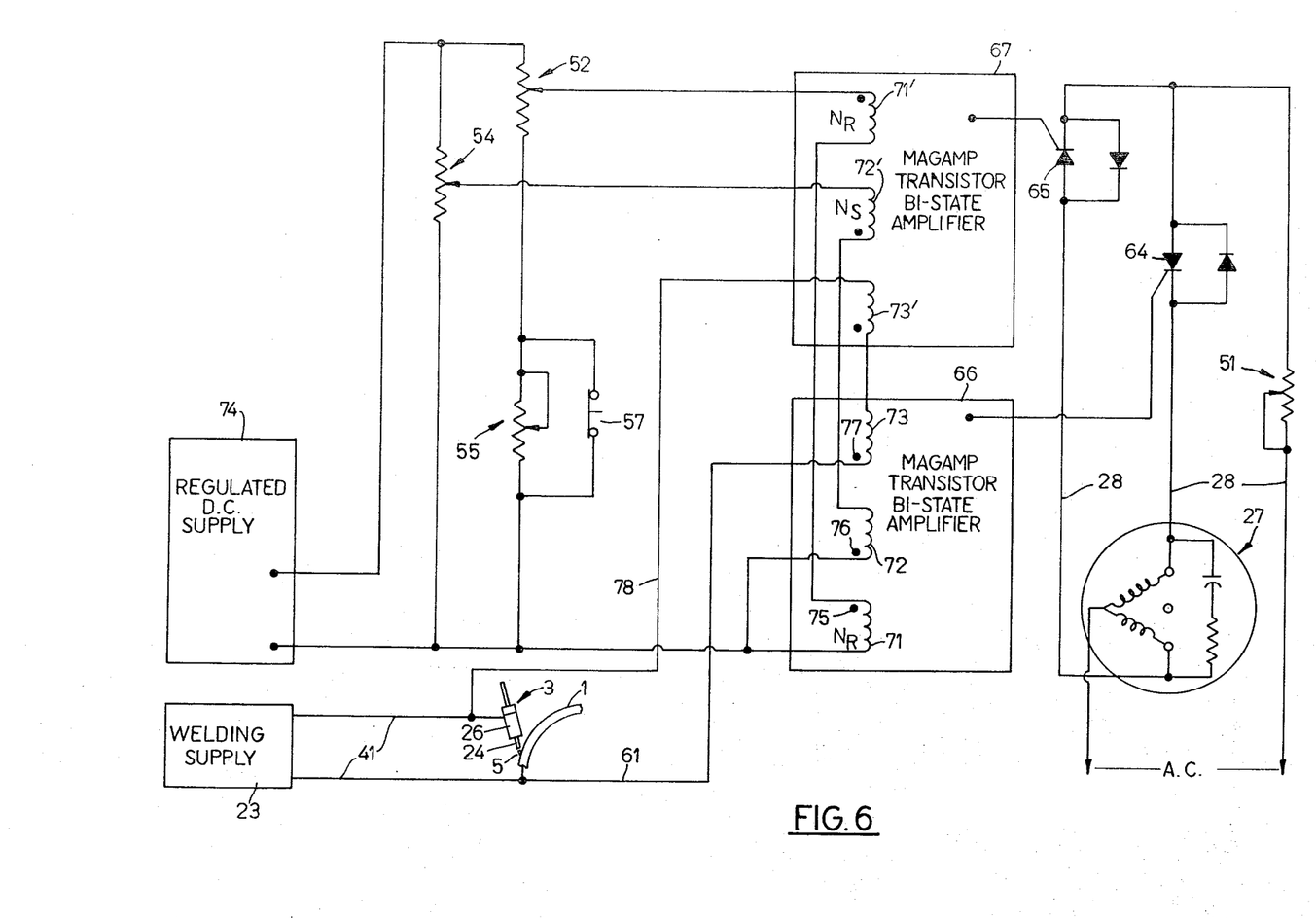
FIG. 6 is a simplified schematic illustration of the electrode control positioning system for maintaining determined positioning of the electrode with respect to the drum.

A suitable comparing and control curcuit is schematically shown in simplified form in FIG. 6 clearly illustrating the interrelationship between the various control elements and the motor operation. Any other suitable similar control can of course be employed.

Referring particularly to FIG. 6, the motor 27 is shown as a conventional capacitor run reversible motor construction with the input connected to a set of ac power lines by the control unit 51 shown as an adjustable potentiometer control in FIG. 6. The motor 27 has one side connected to power directly and the opposite side of the motor selectively connected to establish forward and reverse rotation and in a modulated manner. Thus, the control side of the motor 27 is connected to power through a forward control rectifier means 64 such as a suitable Triax which is selectively fired from the control unit 38 for forward motor drive. Alternately, the reverse drive connection to the motor 27 is through a similar solid state control switch 65. The switches 64 and 65 are selectively controlled by a pair of similar control units 66 and 67 forming a part of and mounted within the control unit 38. The control units are shown as the well known magamp transistor bi-state amplifiers providing signals to either control switch 64 or 65 to produce full on or full off drive power as a result of the bi-stable action. The magamp is a conventional unit having its input power derived directly from the incoming lines. The unit 66 will be generally described with corresponding illustrated elements of the unit 67 identified by similar primed numbers.

The illustrated circuit includes a pre-set control winding 71 connected in series with the corresponding winding 71' of amplifier 67 to the voltage setting unit 52 shown as a variable potentiometer. The current control unit 55 is a variable resistor connected in series with the potentiometer 52 across a regulated dc supply 74. The push button switch 57 is a normally closed switch connected across the unit 55 such that the command signal is related to the voltage unit 52. Thus, the output tap of the voltage unit 52 is at a proportionate voltage depending upon the setting of the current control 55 and provides a predetermined voltage and current signal in the related control winding 71. The amplifiers 66 and 67 similarly include sensitivity control windings 72 and 72' connected in series with each other across the sensitivity control unit 54. The sensitivity control unit 54 is a variable potentiometer connected across the regulated dc supply 74 and thus providing a corresponding signal to the sensitivity control windings of the magnetic amplifier system. Thus these several windings are wound on a common core as diagrammatically illustrated. The sensitivity control winding 72 is connected to a relatively high resistance element to provide a relatively small bias on the magnetic amplifier. The main control winding 71 and the sensitivity winding 72 are wound to establish opposite controls as shown by the polarity sensing dots 75 and 76 respectively. Windings 71 and 72 in combination thus provide a command input signal to the bi-stable amplifier 66. This signal is magnetically compared with an arc sensitive signal applied to the winding 73 which is wound to oppose the polarity of the main winding 71 as shown by the polarity dot 77. The windings 73 and 73' are connected in series across the arc 5. Thus, the sensing line 61 provides a common ground return to the one end of the winding 73. The opposite end of the winding is connected in series with the winding 73' and via a lead 78 to the arc torch assembly 3 and particularly the incoming power supply or contact block 43. Thus, the actual arc voltage appearing across the arc 5 also appears across the winding 73 and 73' and provides a proportionate signal. This signal is thus magnetically compared with the pre-set command signal to control the actuating state of the respective amplifier 66. If the voltage increases beyond a desired pre-set value, the forward drive magnetic amplifier will establish an output signal to fire the controlled rectifier unit 64 and thereby energize motor 27 to provide forward feed of the electrode. If for any reason the electrode too closely approaches the arc and the arc voltage decreases below the desired value, the output state of the amplifier 66 reverses and removes the output signal. Simultaneously however, the magamp transistor bi-state amplifier 67 will then be energized to establish an output signal thereby causing energization of the motor 27 to cause retraction of the electrode. The rate of electrode movement is of course determined by the wire feed control unit 51. Further, if it is desired to momentarily increase the current level, the push button switch unit 57 is activated. The switch unit is connected in parallel with the current control unit 55 and when actuated opens to introduce the current control resistor in a manner which results in the positioning of the electrode to increase the power supplied to the arc 5. For example, as the arc 5 traverses the weld 13 in the pipe 1, switch 57 is opened to momentarily increase the current to more appropriately remove the metal of the weld 13.

Figure 7:
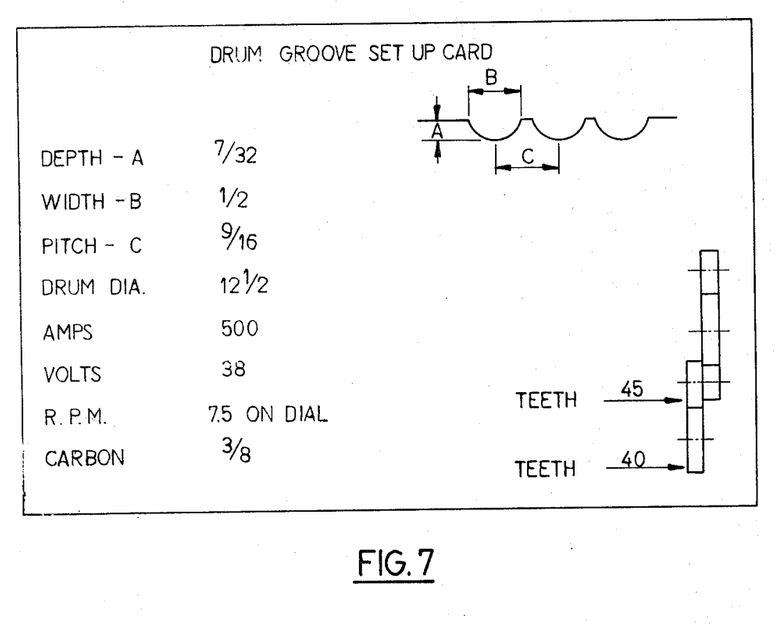
FIG. 7 is an illustration of a drum set-up card for the apparatus of FIGS. 1-6.

The present invention is particularly adapted to mass production processes where drums of various sizes and with various groove characteristics are required. Thus the operator needs to merely adjust the various settings to establish the desired groove characteristic. For example, each of the drum sizes and groove sizes may be tabulated on a separate set-up card such as shown in FIG. 7. The card includes the information regarding the grooved size and particularly the depth, width and pitch, as well as the drum diameter. This allows the operator to check the output characteristics on a grooved drum. Further, the amperage and voltage settings, as well as the electrode feed to be produced by unit 51 are tabulated on the card. The electrode diameter is also specified. A diagrammatic illustration of the gears are provided, with the appropriate change gears 18 labeled by the number of teeth thereon. Thus, the information carried on the set-up card provides the operator with all of the information required to automatically produce the desired grooved characteristics.

Thus, in operation the operator selects or is given the appropriate set-up card for a particular drum. The electrode is manually fed to a starting position. The power connections from the power supply 23 and in particular the ground connections of leads 41 and 61 are provided, with the appropriate dial settings to predetermine the desired characteristic grooving. The electrode 24 is carefully angularly oriented with respect to the periphery of the drum 1. The electrode 24 is appropriately spaced from the drum 1 and in particular with the tip of the electrode essentially located to establish an arc 5 in the horizontal plane lying just below the axis of the drum. The arc voltage control in combination with the forward travel speed and the rotational speed of the drum 1 establishes an automatic removal rate to establish a predetermined groove. The careful angle orientation of the electrode results in a groove having a truly cylindrical base portion which will accurately and properly support the wire rope with the sides spaced slightly from the sides of the rope. The arc formed groove 6 is found to provide a direct finished surface which does not require any further machining. The arc 5 further treats the groove surface to develop a hardened portion 79 as most clearly shown in FIG. 2. This hardened portion projects slightly into the drum metal and may in fact have a slight transition area 80 between the hardened portion and the base metal. This is highly desirable as the hardened surface provides an improved wear resisting characteristic with respect to the movement of the wire rope 8 across the hardened surface.

The present invention thus provides a relatively inexpensive method and apparatus for forming of grooved hoist drums and the like and at a minimum of expense and with an improved wear characteristic.

I claim:

1. A drum grooving apparatus for producing a helical groove on the periphery of a metal drum, comprising a rotating means having a horizontal support means for rotating the drum about its own axis and means to drive said support means at a constant speed, a carriage means movable longitudinally of said support means and drum, a cutting torch means mounted on said carriage and having a cutting electrode having an arc end aligned with the side periphery of the drum and essentially in a horizontal plane through the center of the drum and operable to establish an electric arc to said drum to remove surface metal from the drum to form a groove therein, said cutting torch means including contact means releasably coupled to the drum to establishing an arc current path, a fluid jet means located to produce a fluid jet essentially only applied to the upper side of the arc to remove the metal without disruption of the arc, and means to actuate said carriage means in synchronism to said support means to move said carriage means at a constant speed and form said helical groove in said drum with an essentially finished surface.

2. The apparatus of claim 1 wherein said drum is formed of steel having an outer covering of an anti-splatter protective material, said material reacting with said arc to prevent sticking of slag and metal spatter formed by the arc.

3. The drum grooving apparatus of claim 1 having means to adjust the speed of said support means, and said means to actuate said carriage means being a coupling between the carriage means and the support means drive to provide an interrelated movement of the cutting electrode relative to the rotation of the drum.

4. The drum grooving apparatus of claim 1 wherein said electrode is a carbon stick electrode of a diameter slightly less than the desired width of the groove, said electrode being mounted with the arc tip generally aligned with the periphery of the drum to establish the arc in a horizontal plane passing through the drum slightly below the rotating axis.

5. The drum grooving apparatus of claim 4 wherein said electrode is located generally tangentially of the drum.

6. The drum grooving apparatus of claim 4 wherein said electrode is located at an angle of substantially 30° from a vertical plane through said tip and periphery of the drum.

7. The drum grooving apparatus of claim 1 wherein said electrode has a tip aligned with the periphery of the drum lying in a horizontal plane passing through the drum and rotating axis, said electrode being located generally tangentially of the drum and at an angle of about 30° from a vertical plane through the end of the electrode and the periphery of the drum in said horizontal plane.

8. The drum grooving apparatus of claim 1 having a collecting means located beneath said drum, and cooling liquid means at the top of the collection means to cool the molten metal removed from the drum.

9. The drum grooving apparatus of claim 1 having a collection means located beneath said drum, and connected to said carriage means, cooling water spray nozzles at the top of the collection means to establish a curtain of cooling water on the surfaces to cool the molten metal removed from the drum.

10. The drum grooving apparatus of claim 1 wherein the cutting torch means includes a carbon electrode and a motor means for adjusting the position of the electrode relative to the drum, an arc voltage sensing means connected to continuously monitor the arc and actuate the motor means to maintain a predetermined cutting arc, and means to mount said arc voltage sensing means on said carriage means for movement with said cutting torch means.

11. The drum grooving apparatus of claim 10 wherein said motor means is an alternating current reversible motor, said sensing means including a comparator having a pair of input means connected to compare a command voltage with the actual arc voltage and produce an error signal at an output means, and means connecting said motor to said output means and operable to connect the motor for forward or reverse drive to reposition said motor to maintain a selected arc voltage, and a variable voltage input means connected to said output means for selection of the speed of moving of said electrode.

12. The drum grooving apparatus of claim 1 wherein said rotating means includes a rotating shaft having chuck means for supporting the drum, contact means slidably coupled to said shaft for providing an arc current return path from the drum.

13. The drum grooving apparatus of claim 1 wherein said rotating means is a lathe-type structure having a head chuck adapted to releasably grip one end of the drum, a motor driven gear reducer connected to drive the head chuck and including rapid speed change gears for setting of the carriage means to maintain a constant groove pitch in relation to the chuck and wherein said electrode is a carbon stick electrode, said torch means having an alternating current reversible motor coupled to position said electrode, a sensing means including a comparator having a pair of input means connected to compare a command voltage with the actual arc voltage and produce an error signal at an output means operable to connect the motor for forward or reverse drive to reposition said motor to maintain a selected arc voltage, a variable voltage input means mounted on said carriage means and connected to said output means for selection of the speed of moving of said electrode, an air jet means mounted immediately above the tip of the electrode and establishing an air jet along the top of the electrode impinging upon the top of the molten metal, a collection means secured to the carriage means beneath said drum and in alignment with said torch electrode to collect the removed metal, and a water spray nozzle means connected to the collection means and establishing a water spray across the top of the collection means for cooling the molten metal.

14. The drum grooving apparatus of claim 13 wherein said lathe-type structure has a lead screw coupled to said chuck and to said carriage means to move the cutting electrode axially of the drum at a selected speed to produce a selected groove pitch.

15. A hoist rope drum forming apparatus for producing an essentially finished helical rope groove in the face of a cylindrical metal drum for receiving a hoist rope, comprising a lathe apparatus having a rotating head chuck adapted to releasably clamp one end of the drum and rotating said drum with a horizontal axis, means to vary the rotating speed of the chuck, a carriage means coupled to be driven with the chuck and moving longitudinally of the head chuck at a constant speed, carbon arc torch assembly mounted on said carriage and including means to linearly and angularly adjust the location of the tip of a carbon electrode to accurately locate the electrode adjacent the drum with the electrode tip essentially in the horizontal plane through the axis of the drum, and generally tangential of the drum, said torch assembly having a motor coupled to feed the electrode toward and from the drum to maintain a selected arc, said torch assembly having a fluid jet means for creating a fluid stream over the top of the arc for forcing of the molten metal from the drum, and a control means mounted on said carriage means and having an electrode feed rate control and an arc sensing control connected to actuate a motor control means connected to motor means, said control means further having means connected to an arc power supply and to a fluid source and operable to selectively supply power to the electrode and fluid to the jet means.

16. The drum forming apparatus of claim 15 having a collection tank means secured to the carriage means beneath the drum support in alignment with the electrode, and a water spray means secured to the tank means to cool the metal removed from the drum.

17. The hoist drum forming apparatus of claim 15 wherein said drum is formed of a tubular steel blank and is provided with an outer lead paint coating on the blank, said lead paint reacting with said arc.

* * * * *